US008438151B1

(12) United States Patent
Billman et al.

(10) Patent No.: US 8,438,151 B1
(45) Date of Patent: May 7, 2013

(54) BIAS FREE PROPERTY REPORTS

(75) Inventors: Bradly Jay Billman, San Antonio, TX (US); Charles Lee Oakes, III, Boerne, TX (US); Rickey Dale Burks, Boerne, TX (US); Michael Patrick Bueche, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 324 days.

(21) Appl. No.: 12/059,584

(22) Filed: Mar. 31, 2008

(51) Int. Cl.
*G06F 7/00* (2006.01)
(52) U.S. Cl.
USPC .......................................... 707/713
(58) Field of Classification Search ............. 707/713
See application file for complete search history.

(56) References Cited

U.S. PATENT DOCUMENTS 6,636,803 B1 * 10/2003 Hartz et al. ................. 701/459
7,072,665 B1 7/2006 Blumberg et al. ......... 455/456.1
2001/0031640 A1 10/2001 Waller et al.
2002/0052786 A1 5/2002 Kim et al.
2003/0064705 A1 4/2003 Desiderio
2004/0030616 A1 2/2004 Florance et al.
2004/0198389 A1 10/2004 Alcock et al. ............. 455/456.1
2006/0020518 A1 1/2006 Lovinson et al.
2007/0118426 A1 5/2007 Barnes, Jr. et al. ............. 705/14
2007/0266439 A1 * 11/2007 Kraft .............................. 726/26
2008/0103787 A1 5/2008 Cavanaugh et al.
2008/0306982 A1 * 12/2008 Moudy ....................... 707/102

OTHER PUBLICATIONS

"LBS Toolkit—Garmin Developer". Downloaded on Feb. 6, 2008, http://developer.garmin.com/lbs/lbs-toolkit/.

* cited by examiner

*Primary Examiner* — Truong Vo
(74) *Attorney, Agent, or Firm* — Brooks, Cameron & Huebsch, PLLC

(57) ABSTRACT

Methods, systems and computer readable instructions to provide unbiased real property information to an end-user based on the location of the end-user when the end-user initiates a request for the real property information. The real property information is unbiased because the provider of the real property information searches for information that may adversely affect a potential transaction and provides the information found in the search regardless of the potential effect on a transaction.

21 Claims, 7 Drawing Sheets

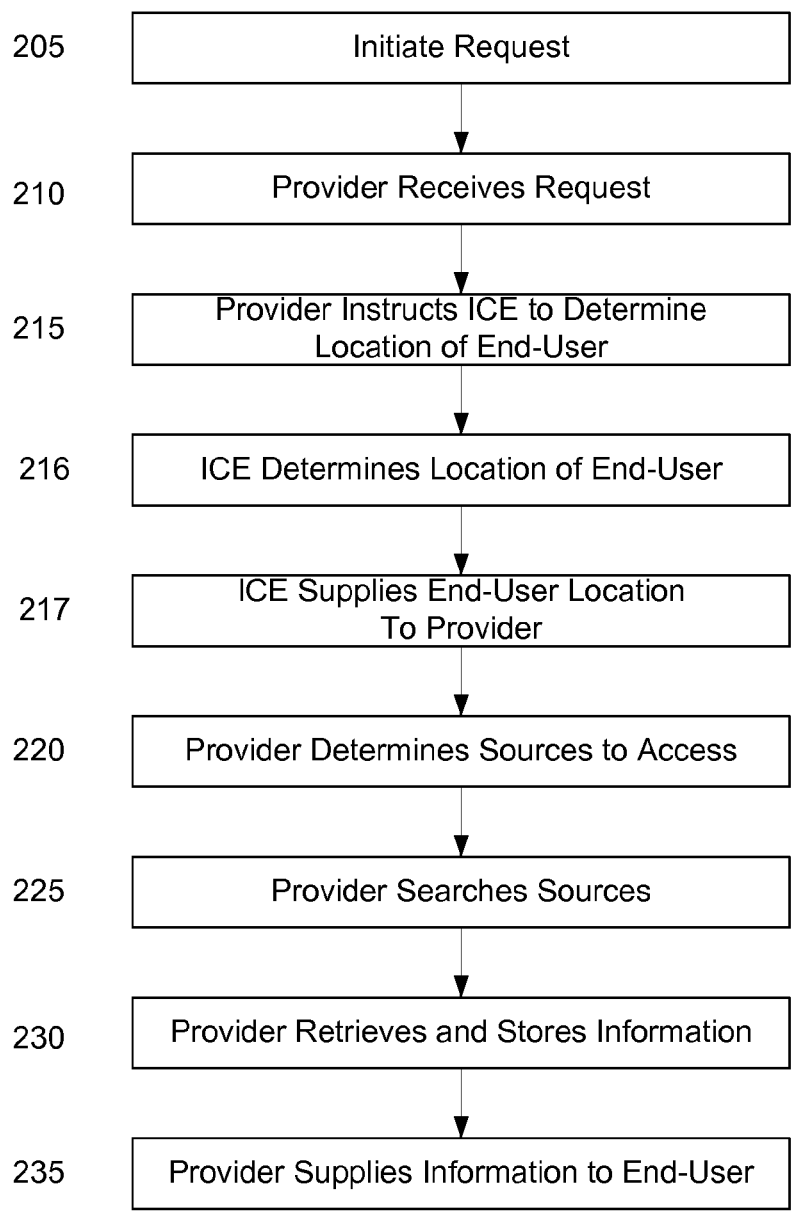

Figure 3

| Category (305) | Distance (361) | | | Time (365) | | |
|---|---|---|---|---|---|---|
| | One Mile (362) | Five Mile (363) | Ten Mile (364) | One Months (366) | Two Months (367) | Twelve Months (368) |
| Property for Sale (321) | | X | | | | |
| Mortgage in Default (322) | | | | | | X |
| Liens (323) | | | | | | |
| Homeowners' Insurance Claims (324) | | | | | | X |
| Police Activity (325) | | | | | | X |
| Bankruptcy (326) | | | | | | |
| Properties for Sale (331) | | X | | | | |
| Average Asking Price (332) | | | | | | |
| Average Days on Market (333) | | | | | | |
| Properties Sold (334) | | | | | | X |
| Average Sales Price (335) | | | | | | |
| Foreclosure Rate (336) | | | | | | X |
| Cancellation Rate (337) | | | | | | X |
| Prisons (341) | | X | | | | |
| Sexual Offenders (342) | | X | | | | |
| EPA Superfund Sites (343) | | X | | | | |
| High Tension Lines (344) | | X | | | | |
| Industrial Sites (345) | | X | | | | |
| Traffic Congestion Areas (346) | | X | | | | |
| Construction Areas (347) | | X | | | | |
| Hospitals (348) | | X | | | | |
| Supermarkets (349) | | X | | | | |
| Public Schools (350) | | X | | | | |
| Private Schools (351) | | X | | | | |
| Restaurants (352) | | X | | | | |
| Military Friendly Communities (353) | | X | | | | |

320, 330, 340, 360

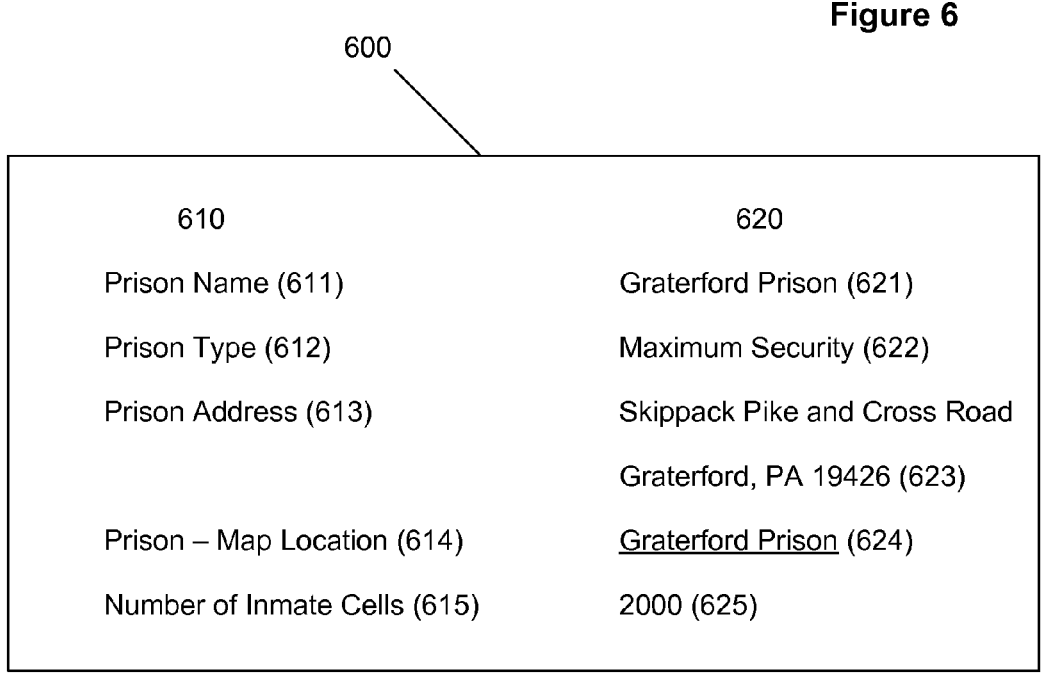

BIAS FREE PROPERTY REPORTS

CROSS REFERENCE TO RELATED APPLICATIONS

This application is related by subject matter to the inventions disclosed in the following commonly assigned applications: U.S. patent application Ser. No. 12/059,115 and U.S. patent application Ser. No. 12/059,533, each filed on Mar. 31, 2008, and each entitled "Bias Free Property Reports." The disclosure of each application is incorporated by reference herein in its entirety.

BACKGROUND

Those seeking information relating to real property currently face many problems with accessing unbiased real property information in a convenient way. For example, many of the sources of real property information have conflicts of interest that may cause the source to be biased. In addition, there is no convenient way to receive unbiased information while away from a fixed location such as a home or office. Further, to get unbiased real property information, many different sources and data types may need to be searched. Other problems include not knowing what information is needed or where to find the information. In addition, the information may not be available to those who are not real property professionals.

Much of the information that is available concerning real property may be provided by sources that have interests that conflict with providing an accurate picture of a particular property, a particular real-property market, etc. For example, when considering the purchase of a home, a potential buyer may receive information from a seller's agent. While information provided by the seller's agent may be useful, the seller's agent has a conflict of interest because the seller's agent works for the seller and typically has a financial interest in the sale of the home. Indeed, the seller's agent has a financial incentive to withhold negative information about the particular property and the real-property market in which the property is located. Even if the agent is a dual agent, representing both the buyer and seller, the agent still has a conflict of interest because the agent is typically paid at closing.

One example may be when a potential buyer evaluates at a home for sale at a particular price. The agent may have information that shows similar houses in the area selling for less than the asking price of the home, or may show that sold homes in the area were on the market for a long time before they sold. It may help a potential buyer to have this information, but if the agent is confronted with a willing buyer and seller, the agent may have an incentive to withhold this useful information. Thus, the buyer may pay more than the seller was willing to accept or purchase the home at an above market price.

Much of the real property information valued by end-users is only available through private or public businesses. For example, the realtors in most states participate in a multiple listing service (MLS) where complete information may only be available to realtors or people who pay for the MLS service. As another example, some for-profit companies provide projected home value estimates. And, some newspapers provide school quality information. Furthermore, some organizations may keep their own records, which are not publicly available. Examples of such organizations include membership organizations, such as USAA, employer/employee organizations, and providers of services, such as insurance companies.

SUMMARY

In view of the above shortcomings and drawbacks, computer-readable media, methods, software applications and systems for providing unbiased real property information to an end-user at the end-user's current location are provided.

In the claimed embodiments, an end-user requests, and a provider supplies, unbiased real property information based on the location of the end-user when the end-user initiates the request for the real property information. The real property information may comprise information about a property associated with the request, information about a real property market associated with the request and factors that may affect property values in the real property market and of the property. The claimed embodiments may allow an end-user to access real property information from a variety of sources with much less effort than it would take the end-user to gather the real property information. Further, the claimed embodiments may allow an end-user to access real property information from sources that the end-user could not otherwise access.

BRIEF DESCRIPTION OF THE DRAWINGS

The foregoing summary, as well as the following detailed description, is better understood when read in conjunction with the appended drawings. For the purpose of illustrating the claimed subject matter, there is shown in the drawings example constructions of various embodiments; however, the invention is not limited to the specific methods and instrumentalities disclosed.

FIG. 2 illustrates an exemplary method to provide information relating to real property.

FIG. 3 illustrates an exemplary list of categories and related limiting parameters that may be used to search for information relating to real property.

FIG. 6 illustrates an exemplary rendering of information relating to real property that may be embedded in other renderings.

DETAILED DESCRIPTION

Figure 1A:
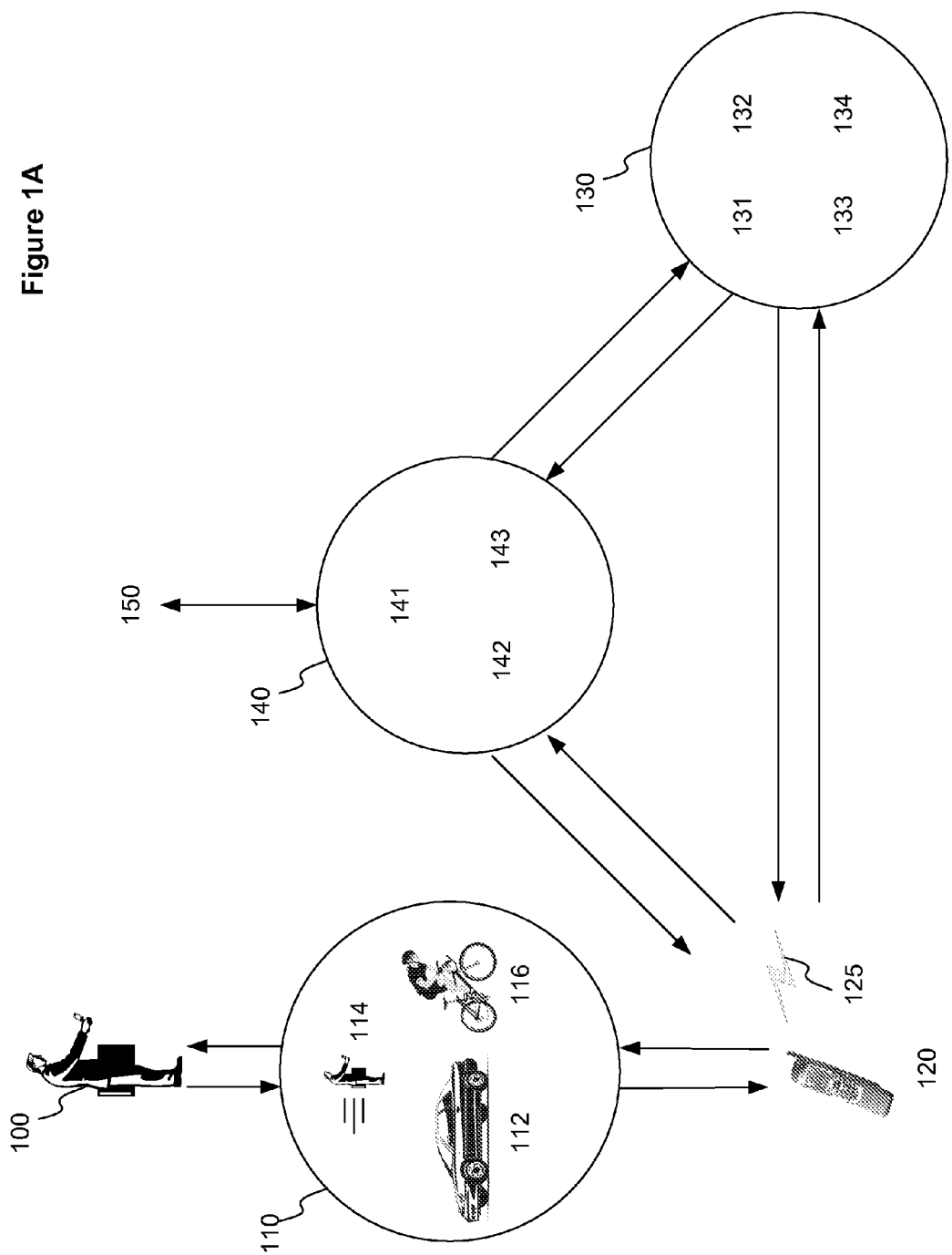
FIG. 1A illustrates exemplary systems through which an end-user and provider may communicate.

The subject matter of the described embodiments is described with specificity to meet statutory requirements. However, the description itself is not intended to limit the scope of this patent. Rather, the described embodiments may include different steps or elements. Moreover, although the term "step" may be used herein to connote different aspects of methods employed, the term should not be interpreted as implying any particular order among or between various steps herein disclosed unless and except when the order of individual steps is explicitly described.

In the claimed embodiments, an end-user may seek information relating to real property, which may also be referred to as real property information. Real property information may include any information that anyone may consider relevant to determining the value of real property and further includes information that may negatively affect property values. An end-user may seek real property information while the end-user is away from a fixed location. For example, the end-user may be away from the end-user's fixed residence or place of business, i.e., the end-user is "on-the-go." Further, the end-user may seek real property information based on the end-user's current location. An end-user may include, but is not limited to, buyers, sellers, owners, renters, lessees, lessors, or combinations of them, and the like, whether actual or potential, as well as agents of any of them. An end-user may seek protection from real property information that is biased by seeking out information that may adversely affect property values, in addition to information that may enhance property values.

Real property information may be sought by those who are on-the-go. For example, a business owner may be driving down a highway and pass a property for sale that he feels may be a good location to relocate his business. It may be inconvenient or impossible for the business owner to stop and take steps to determine his location and get information on the property. Although the business owner may want and need information on the property for sale, he may not be able to obtain it at a time that is convenient for him. Any delay in receiving real property information may have drastic consequences. For example, once a property is sold it is no longer available. Unlike fungible products, real property may be unique. Thus, there may be a small number of properties that qualify as genuinely attractive to a particular party, such as the businessman in our example. Further, out of the small number of suitable properties, none may be available for purchase. When one is available and discovered by a potential buyer, getting the real property information relevant to the property as quickly as possible may be essential to obtaining the property. The claimed embodiments may assist an end-user that is on-the-go to quickly obtain real property information. For example, the claimed embodiments may enable an end-user to request, and a provider to supply, unbiased real property information based on the location of the end-user when the end-user initiates a request for the real property information.

Currently, many end-users may not be able to get the real property information they want or may need to go through great effort to get the real property information. Real property information comes from disparate sources. For example, some real property information may come from governmental sources, however, the real property information may come from federal, state, or local governments or any combination of the three. Further, real property information may come from multiple sources within each branch of government, each with their own record keeping. As an example of the federal level, information about Superfund sites may be kept by the Environmental Protection Agency (EPA), while records about planned interstate highway construction may be kept by the Department of Transportation. As an example at the state level, information on the whereabouts of sex offenders may be available through law enforcement branches of state government such as the attorney general's office, while information about tax rates may be available through a department of revenue or the like. As an example at the local level, information on crime rates may be available through the local police department, while information about whether a pool can be installed at a particular property may be available only through the code enforcement office. Although some governmental information may be available if an end-user knows where to look for the information, other information may only be electronically available through non-governmental record keeping sources such as some local title records or local ordinances. The claimed embodiments may assist an end-user in obtaining unbiased real property information from disparate sources. For example, the claimed embodiments may determine the sources that need to be searched in order to provide the unbiased real property information. The claimed embodiments may then search the disparate sources and provide the unbiased real property information found from the disparate sources.

An end-user may need to communicate with systems such as a network in order to request and receive real property information. In addition, a provider may need to communicate with systems such as a network in order to receive the request and supply the real property information. Further, because the real property information may relate to the end-user's location when making the request, a provider of the real property information may need to determine the approximate location of the end-user. FIG. 1A illustrates examples of how an end-user may access such systems in order to request and receive real property information and how such systems may determine the end-user's location. FIG. 1A also illustrates how a provider may access such systems in order to receive the request and supply the real property information.

At location 110, the end-user 100 is on-the-go. The end-user 100 may be on-the-go for any reason. Non-limiting examples of being on-the-go include driving in a car 112, walking 114 and riding a bicycle 116.

The end-user 100 may want real property information based on his location 110. For example, the end-user 100 may be driving in a car 112 through a neighborhood and observe a home for sale in which the end-user 100 may be interested. The end-user 100 may use a device 120 to request the real property information from a provider 150. The device 120 may be any device that may allow the end-user 100 to request real property information from the provider 150. The device 120 may also allow the provider 150 to detect the location 110 of the end-user 100. Examples of the device 120 include a mobile phone, any portable computer, e.g. laptop computer, tablet computer, etc., a personal digital assistant ("PDA"), a portable email device, a navigation device, a GPS device, a pager, a public computing device, or the like, or, any combination thereof.

The end-user 100 may use the device 120 to initiate a request for real property information by any means, including assigning the function to one button of the device 120. The end-user 100 may then press the button to request the real property information. Alternately, a series of buttons may need to be pressed, with or without intervening prompts. Other methods of initiating a request for real property information include logging onto the provider's system, a website for example, and navigating to a digital button or hyperlink that may be activated to initiate the request. Another method would be to initiate a phone call to a specific number, where additional prompting may or may not be necessary.

The device 120 may communicate directly with the provider 150. The device 120 may also communicate with a network 140 that communicates with the provider 150. The network 140 may include the internet 141, a WAN 142, a LAN 143, and the like. The device 120 may also communicate with intermediate communications equipment ("ICE") 130, which may communicate with the provider 150 directly or through the network 140. Examples of intermediate communications equipment 130 include cell phone towers 131, satellites 132, utility network data collectors 133, land lines 134, and the like.

The exemplary implementations also illustrate how the provider 150 may receive the request and supply the real property information. The end-user 100 may initiate a request for real property information. After initiating the request, the device 120 may send a signal 125. The signal 125 may be received by the intermediate communications equipment 130. The intermediate communications equipment 130 may send the signal 125 to the network 140, and, the signal 125 may be received by the network 140. The network 140 may send the signal 125 to the provider 150, and, the signal 125 may be received by the provider 150.

The signal 125 may or may not contain information about the location 110 of the end-user 100. The intermediate communications equipment 130 may be configured to determine the approximate location 110 of the device 120, and therefore the approximate location 110 of the end-user 100 because the end-user 100 is in proximity to the device 120. If the signal 125 does not contain information about the location 110 of the end-user 100, the provider 150 may instruct the intermediate communications equipment 130 to determine the location 110 of the end-user 100. In response, the intermediate communications equipment 130 may determine the location 110 of the end-user 100 or supply information to the provider 150 so that the provider 150 may determine the location 110 of the end-user 100.

In one example, the device 120 includes a GPS system. When the end-user 100 initiates a request, the device 120 includes the location 110 information in the signal 125, where the location 110 of the end-user 100 is supplied with the request. Instead of the location information being automatically sent, either the intermediate communications equipment 130, the network 140 or the provider 150 may instruct the device 120 or the end-user 100 to supply the location 110 information upon receiving a request. For example, the device 120 may automatically send the location 110 information upon receiving the request, or, the device 120 may prompt the end-user 100 to provide the location 110 information. Alternately, the provider 150 can provide instructions to the intermediate communications equipment 130 to determine the location 110 of the end-user 100. One way that the intermediate communications equipment 130 may determine the location 110 of the end-user 100 is to use triangulation between multiple receiving towers. Another way would be to determine strength of the signal 125 at multiple reception points and assume the reception point with the strongest signal strength is the location 110 of the end-user 100.

There are numerous networks in place that could perform these functions, such as networks created by telephone companies, electric companies, cable television companies, internet providers, etc. New networks may also be constructed. In another example, the provider 150 may instruct the intermediate communications equipment 130 to take actions that may allow the provider 150 to determine the location 110 of the end-user 100. Such a method would be for the intermediate communications equipment 130 to provide signal strength or triangulation information to the provider 150 allowing the provider 150 to make the final determination of location 110. The location 110 of the end-user 100 may also be determined by any combination of the above steps or by any locating method currently used or implemented in the future.

Figure 1B:
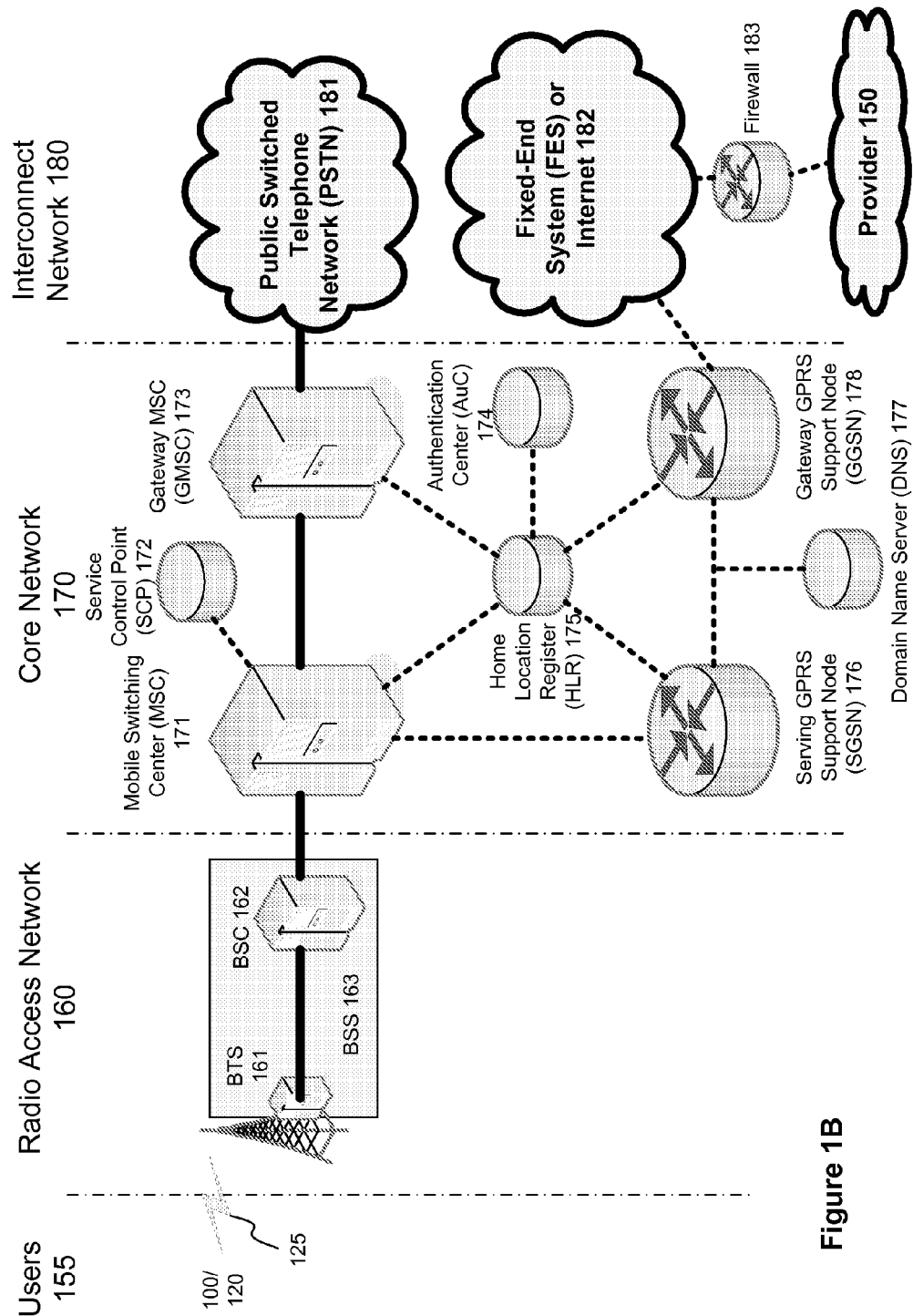
FIG. 1B illustrates an exemplary network through which an end-user and provider may communicate.

FIG. 1B is a diagram of an exemplary network environment as one example of network 140. The following information may help in understanding FIG. 1B. The global system for mobile communication ("GSM") is one of the most widely-used wireless access systems in today's fast growing communication systems. GSM provides circuit-switched data services to subscribers, such as mobile telephone or computer users, for example. General Packet Radio Service ("GPRS"), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications. For purposes of explanation, various embodiments are described herein in connection with GSM. The references to GSM are not exclusive, however, as it should be appreciated that embodiments may be implemented in connection with any type of wireless access system such as, for example, CDMA or the like.

As may be appreciated, the example GSM/GPRS environment and services described herein can also be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000 3x"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that shall become available in time. In this regard, the techniques of the various embodiments discussed below may be applied independently of the method of data transport, and does not depend on any particular network architecture, or underlying protocols.

FIG. 1B illustrates the architecture of a typical GPRS network as segmented into four areas: users 155, radio access network 160, core network 170 and interconnect network 180. Users 155 may include a plurality of end users such as end-user 100 as well as other users of the network. The users may employ any type of device capable of communicating with the network, including users of devices such as device 120. The radio access network 160 may include a plurality of base station subsystems such as the BSSs 163, which include Base Transceiver Stations (BTSs) 161 and Base Station Controllers (BSCs) 162. The core network 170 may include a host of various network elements. As illustrated here, the core network 170 may include a Mobile Switching Center ("MSC") 171, a Service Control Point ("SCP") 172, a gateway MSC 173, a Serving GPRS Support Node (SGSN) 176, a Home Location Register ("HLR") 175, an Authentication Center ("AuC") 174, a Domain Name Server ("DNS") 177 and a Gateway GPRS Support Node (GGSN) 178. The interconnect network area 180 also may include networks and network elements. As illustrated in FIG. 1B, the interconnect network 180 may include a Public Switched Telephone Network ("PSTN") 181, a Fixed-End System ("FES") and/or the Internet 182, a firewall 183 and/or provider 150.

A mobile switching center 171 may be connected to a large number of base station controllers. At MSC 171, for example, depending on the type of traffic, the traffic may be separated such that voice may be sent to Public Switched Telephone Network ("PSTN") 181 through Gateway MSC ("GMSC") 173, and/or data may be sent to the SGSN 176, which then sends the data traffic to the GGSN 178 for further forwarding.

When the MSC 171 receives transmission traffic, for example, from the BSC 162, it may send a query to a database hosted by the SCP 172. The SCP 172 may process the request and may issue a response to the MSC 171 so that it may continue processing received transmissions as appropriate.

The HLR 175 may be a centralized database for users to register with the GPRS network. The HLR 175 may store static information about the subscribers such as the International Mobile Subscriber Identity ("IMSI"), subscribed services, and/or a key for authenticating the subscriber. The HLR 175 may also store dynamic subscriber information such as the current location of the mobile subscriber. Associated with HLR 175 may be an AuC 174. The AuC 174 may be a database that contains the algorithms for authenticating subscribers and may include the associated keys for encryption to safeguard the user input for authentication.

In the following, depending on context, the term "device subscriber" may refer to either the end user 100 or to the actual device 120. When a device subscriber turns on device 120, device 120 goes through an attach process by which device 120 attaches to a SGSN of the GPRS network. Referring again to FIG. 1B, the device subscriber may initiate the attach process by turning on the network capabilities of device 120. An attach request may be sent by the device subscriber to the SGSN 176. The SGSN 176 may query another SGSN, to which the device subscriber may have been attached before, for the identity of the device subscriber. Upon receiving the identity of the device subscriber from the other SGSN, the SGSN 176 may request more information from the device subscriber. This information may be used to authenticate the device subscriber to the SGSN 176 by the HLR 175. Once the device subscriber is verified, the SGSN 176 may send a location update to the HLR 175 indicating the change of location to a new SGSN, in this case the SGSN at 130. The HLR 175 may notify the old SGSN, to which the device subscriber was attached, to cancel the location process for the device subscriber. The HLR 175 may then notify the SGSN 176 that the location update has been performed. At this time, the SGSN 176 may send an "Attach Accept" message to the device subscriber, which in turn, may send an "Attach Complete" message to the SGSN 176.

After the attaching process, the device subscriber may enter an authentication process. In the authentication process, the SGSN 176 may send authentication information to the HLR 175, which may send information back to the SGSN 176 based on the user profile that was part of the user's initial setup. The SGSN 176 may then send a request for authentication and ciphering to the device subscriber. The device subscriber may use an algorithm to send the user identification (ID) and/or a password to the SGSN 176. The SGSN 176 may use the same algorithm to compare the result. If a match occurs, the SGSN 176 may authenticate the device subscriber.

Next, the device subscriber may establish a user session with the destination network, the provider 150 for example, by going through a Packet Data Protocol ("PDP") activation process. The device subscriber may request access to the Access Point Name ("APN"), provider.com for example, and the SGSN 176 may receive the activation request from the device subscriber. The SGSN 176 may then initiate a Domain Name Service ("DNS") query to learn which GGSN node has access to the provider.com APN. The DNS query may be sent to the DNS server 177 within the core network 170 which may be provisioned to map to one or more GGSN nodes in the core network 170. Based on the APN, the mapped GGSN 178 may access the requested provider 150. The SGSN 176 may then send to the GGSN 178 a Create Packet Data Protocol ("PDP") Context Request message. The GGSN 178 may send a Create PDP Context Response message to the SGSN 176, which may then send an Activate PDP Context Accept message to the device subscriber.

Once activated, data packets of the transmission made by the device subscriber may then go through radio access network 160, core network 170, and interconnect network 180, to reach provider 150.

FIG. 2 describes an exemplary method by which an end-user 100 may access, and a provider 150 may supply, real property information based on the current location 110 of the end user 100. At 205, the end-user 100 may initiate a request for real property information, which is an example of a real property query. For example, an end-user 100 may initiate a request for real property information while the end-user 100 is driving down a highway and observes a commercial property for sale that interests the end-user 100. At 210, a provider 150 of the real property information may receive the request for real property information. At 215, provider 150 may instruct the intermediate communications equipment 130 (ICE) to determine the approximate location 110 of the end-user 100. At 216, the intermediate communications equipment 130 determines the approximate location 110 of the end-user 100. At 217, the intermediate communications equipment 130 supplies the approximate location 110 of the end-user 100 to provider 150. At 220, provider 150 may determine what sources it may need to access in order to provide the real property information to the end-user 100. For example, provider 150 may need to access a multitude of government, commercial and proprietary databases in order acquire the real property information requested by the end-user 100. At 225, provider 150 may attempt to search for the real property information from the sources determined in 220. At 230, provider 150 may retrieve some, all, or none of the real property information requested in 225. At 235, provider 150 supplies the real property information received in 230, if any real property information was retrieved at 230. Alternately, if no real property information was received in 230, provider 150 may notify the end-user 100 at 235 that provider 150 is unable to supply any real property information.

At 210, provider 150 may receive the approximate location 110 of the end-user 100 along with the request for real property information (e.g., by receiving a GPS signal with the request). If so, 215 may not be needed. Another example would be adding additional steps where provider 150 prompts the end-user 100 to answer questions about which real property information the end-user 100 wants, and the answers of the end-user 100 to the questions. A further example would be where provider 150 supplies the real property information (or confirmation of the lack of real property information) to the end-user 100 via the home and/or office computers of the end-user 100, through the mail, through email, through facsimile, or by any means other than or in addition to the device 120.

FIG. 3 illustrates an example list of categories 305 that a provider may check when searching for real property information. The provider may use the categories 305 to search for real property information relating to a real property query, where the categories 305 may be divided as to generally relate to 1) a specific property 320 associated with the real property query, 2) properties in a real property market 330 associated with the real property query and 3) factors that may affect property values 340 within the real property market 330 associated with the real property query. An end-user may be able to query information from any one, two or three divisions of the categories 305. For example, an end user may desire real property information relating only to a specific property 320, such as a potential buyer that needs to know whether a property has enough bedrooms for the buyer's family. In another example, an end user may desire real property information relating only to properties in a real property market 330, such as a seller who may not need information about the seller's property. In another example, an end user may desire real property information relating only to factors that may affect property values 340, such as a buyer that is familiar with real estate data, but is unfamiliar with factors that may affect property values 340 within the real property market 330.

An exemplary category that relates to a property 320 is the property for sale 321 category, which may return information about whether the property 320 is for sale and the details of the property 320 and proposed terms. Another exemplary category that relates to a property 320 is the mortgage in default 322 category, which may return information about whether mortgages on the property 320 are current. Another exemplary category that relates to a property 320 is the liens 323 category, which may return information about whether there are liens on the property 320, and if so, information on the liens. Another exemplary category that relates to a property 320 is the homeowners' insurance claims 324 category, which may return information about whether there have been any homeowners' insurance claims on the property 320, and if so, information on the claims. Another exemplary category that relates to a property 320 is the police activity 325 category, which may return information about whether there have been any police reports relating to the property 320, and if so, information on the police reports. Another exemplary category that relates to a property 320 is the bankruptcy 326 category, which may return information about whether there are any bankruptcy filings by any of the owners of the property 320.

An exemplary category that relates to the real property market 330 is the properties for sale 331 category, which may return information about properties that are for sale in the real property market 330, including detailed information on each property. Another exemplary category that relates to the real property market 330 is the average asking price 332 category, which may return information about the average asking price of the homes for sale in the real property market 330. Another exemplary category that relates to the real property market 330 is the average days on market 333 category, which may return information about the average number of days the homes for sale in the real property market 330 have been on the market. Another exemplary category that relates to the real property market 330 is the properties sold 334 category, which may return information about properties that have been sold in the real property market 330. Another exemplary category that relates to the real property market 330 is the average sales price 335 category, which may return information about the sales price of the homes that have been sold in the real property market 330. Another exemplary category that relates to the real property market 330 is the foreclosure rate 336 category, which may return information about the number and timing of home foreclosures in the real property market 330. Another exemplary category that relates to the real property market 330 is the cancellation rate 337 category, which may return information about the number and timing of home sale cancellations in the real property market 330.

An exemplary category that relates to factors that may affect property value 340 is the prison 341 category, which may return information about operating prisons in the real property market 330. Another exemplary category that relates to factors that may affect property value 340 is the sexual offenders 342 category, which may return information about whether sexual offenders are living in the real property market 330. Another exemplary category that relates to factors that may affect property value 340 is the EPA superfund 343 category, which may return information about whether there are any EPA listed superfund sites in the real property market 330. Another exemplary category that relates to factors that may affect property value 340 is the high tension line 344 category, which may return information about the location of high tension lines in the real property market 330. Another exemplary category that relates to factors that may affect property value 340 is the industrial site 345 category, which may return information about the location of industrial sites in the real property market 330. Another exemplary category that relates to factors that may affect property value 340 is the traffic congestion 346 category, which may return information about the location of regular traffic congestion in the real property market 330. Another exemplary category that relates to factors that may affect property value 340 is the construction 347 category, which may return information about the location of planned construction in the real property market 330. Another exemplary category that relates to factors that may affect property value 340 is the hospital 348 category, which may return information about operating hospitals in the real property market 330. Another exemplary category that relates to factors that may affect property value 340 is the supermarket 349 category, which may return information about operating supermarkets in the real property market 330. Another exemplary category that relates to factors that may affect property value 340 is the public school 350 category, which may return information about operating public schools in the real property market 330. Another exemplary category that relates to factors that may affect property value 340 is the private school 351 category, which may return information about operating private schools in the real property market 330. Another exemplary category that relates to factors that may affect property value 340 is the restaurant 352 category, which may return information about operating restaurants in the real property market 330. Another exemplary category that relates to factors that may affect property value 340 is the military friendly 353 category, which may return information about whether an area in the real property market 330 may be a good place for military families to live.

The above exemplary categories are not meant to be exhaustive. Categories may be chosen that provide an unbiased reflection on a property or real-property market and includes categories that may adversely affect property value. For example, although all categories 305 may provide information that may adversely affect property values, categories 322-326, 336-337, and 341-347 may have a well-established potential to adversely affect property values. Further, the provider may report the search results regardless of whether the search results returned adversely affect property values or enhance property values.

The provider may add limiting parameters 360 to the categories 305. For example, the provider may add an exemplary limitation such as distance 361 to appropriate categories. The provider may further divide one of the limiting parameters 360. For example, distance 361 may be further divided into one mile 362, five miles 363 and ten miles 364 limiting parameters 360. In a search for hospitals 348 with a limiting parameter 360 of one mile 362, the provider may return information relating to hospitals 348 within one mile of the location 110 of the end-user 100.

As another example of limiting parameters 360, the provider may add a limitation such as time 365 to appropriate categories. For example, the provider may further divide time 365 into one month 366, six months 367 and twelve months 368 limiting parameters 360. A category where the time 365 limitation may be appropriate is the properties sold 334 category. For a limiting parameter 360 of twelve months 368, the provider may return information on those properties that sold in the previous twelve months.

A provider may have default settings for the categories 305 and limiting parameters 360. For example, the provider may search basic real property information categories for an end-user, unless the end-user 100 instructs the provider to perform a different search. FIG. 3, as illustrated, may represent a default search where an "X" represents limiting parameters 360 that have been chosen for categories 305. That is, the provider may use the categories 305 and limiting parameters 360 shown in FIG. 3 to perform a search when receiving a request for real property information unless instructed otherwise by the end-user. It should be appreciated that neither the categories 305 nor the limiting parameters 360 shown in FIG. 3 are exhaustive. Items may be added or deleted from the default categories 305 and limiting parameters 360 as determined by the provider.

A customizable search may also be performed. A customizable search allows an end-user to choose the categories 305 and limiting parameters 360 that the end-user wants to have applied to the search. The customizable search may be implemented by any appropriate means. For example, a customizable search may be implemented by having an end-user navigate through the choices on an interactive search criteria screen accessible through the provider's web site.

Figure 4:
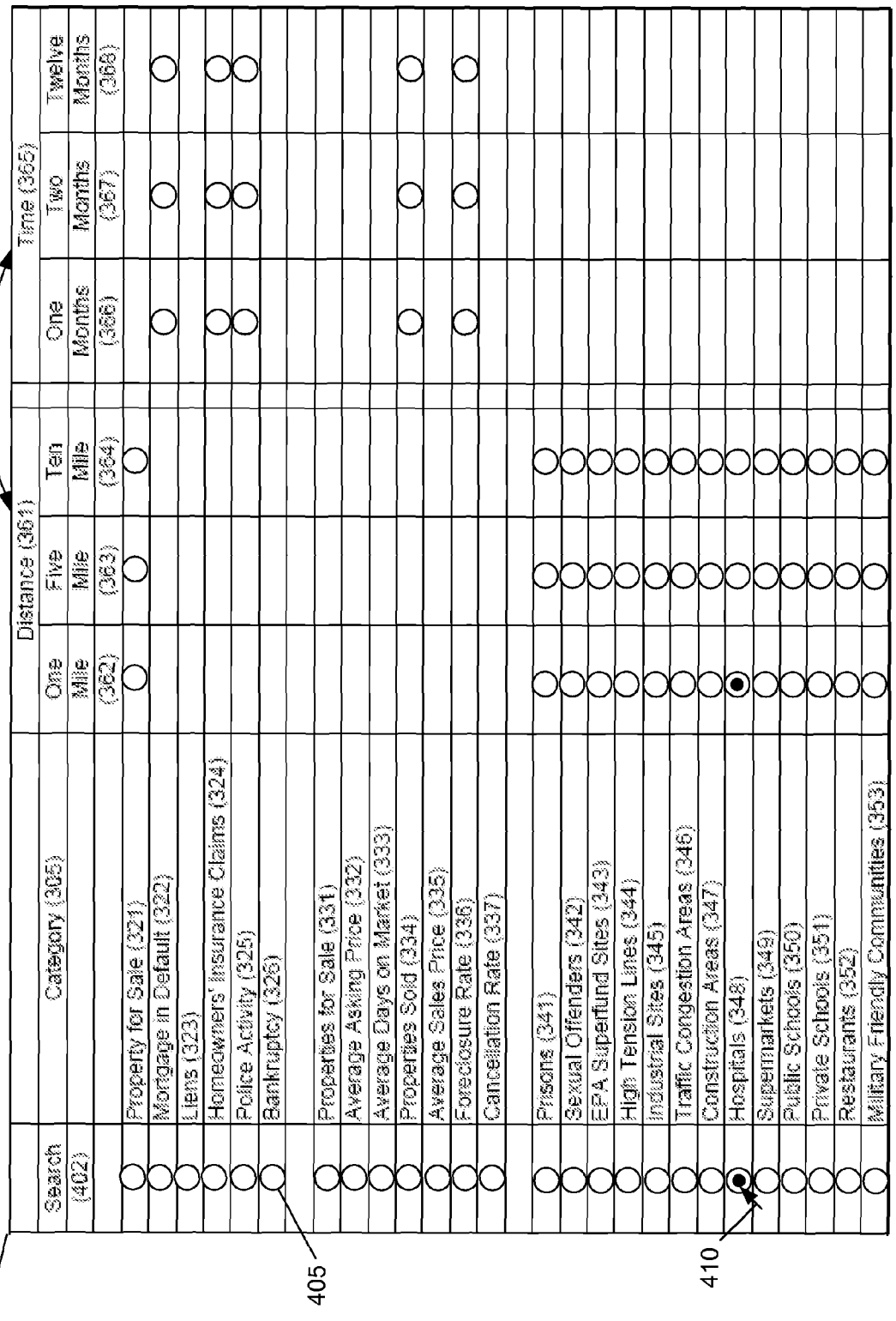
FIG. 4 illustrates an exemplary search criteria screen that may be used to formulate a custom search.

FIG. 4 illustrates an exemplary search criteria screen 400 that allows an end-user to formulate a custom search. The end-user may navigate the search criteria screen 400 and make choices from the exemplary categories 305 and limiting parameters 360. The search criteria screen 400 may provide a search election button 405 where choices are appropriate for categories 305 or limiting parameters 360. For example, an end-user may be able to use the column labeled search 402 to choose a category 305 for inclusion in a search. The end-user may click on a button 405, which may fill-in as an indication that the category 305 or limiting parameter 360 has been chosen. For example, by moving cursor 410 to a button 405 and choosing, through such means as clicking a mouse, the end-user indicates a desire to search the particular category 305. In FIG. 4, cursor 410 is shown as choosing the hospitals 348 category 305 because button 404 for the hospitals 348 category 305 is filled-in.

The search criteria screen 400 also provides a search election button 405 for limiting parameters 360 where appropriate. For example, the hospital 348 category has an available limiting parameter 360 of distance 361. Availability is indicated by a button 405 being available for choosing. Thus, the end-user has the choice of distances one mile 362, five miles 363 or ten miles 364. As illustrated by the filled-in button, the one mile 362 distance 361 limiting parameter 360 has been chosen. The end-user makes similar choices for other categories 305 and limiting parameters 360. The provider then knows the scope of the search when receiving a request 205 from the end-user.

The customizable search may also be implemented on a query basis. For example, while the end-user is on-the-go, the end-user may request a search via any appropriate device such as a cell phone, PDA, portable computer, GPS system, and the like. When the end-user makes the request, the provider may query the end-user on whether to perform a default search or a custom search. If a custom search is chosen, the provider may provide queries for the end-user to answer. The provider may then provide the search based on the answers to the queries. For example, after receiving the request, the provider may prompt the end-user to answer whether or not the end-user wants information on hospitals 348. If so, the provider may prompt the end-user to answer whether he wants to restrict the area of search, such as whether hospitals 348 should be within a certain distance 361 from the location of the end-user. Upon completing the information for the hospitals 348 category 305, the provider may prompt through other categories 305 and related parameters 310. Once the queries are answered, the provider completes the search based on the answers of the end-user to the queries.

The search criteria screen 400 illustrated in FIG. 4 may have more categories 305 and limiting parameters 360 than the choices offered in the default mode, or, the search criteria screen 400 may simply allow an end-user 100 to choose which categories 305 and limiting parameters 360 are to be searched and reported.

The provider may supply any number of categories 305 and limiting parameters 360. Further, the provider may allow for user-defined categories 305 and user-defined limiting parameters 360. For example, an end-user may want information from the properties for sale 331 category limited to properties with an asking price between $250,000.00 and $350,000.00. The provider may offer an asking price limiting parameter as a limiting parameter 360 or may allow the end-user to add an asking price range as a user-defined limitation to the properties for sale 331 category 305. As another example of different limiting parameters 360, the distance 361 limiting parameter 360 may be changed to a county-wide search or any other type of desired search. Other examples of additional limiting parameters 360 include driving distance or driving time to/from other locations.

Figure 5:
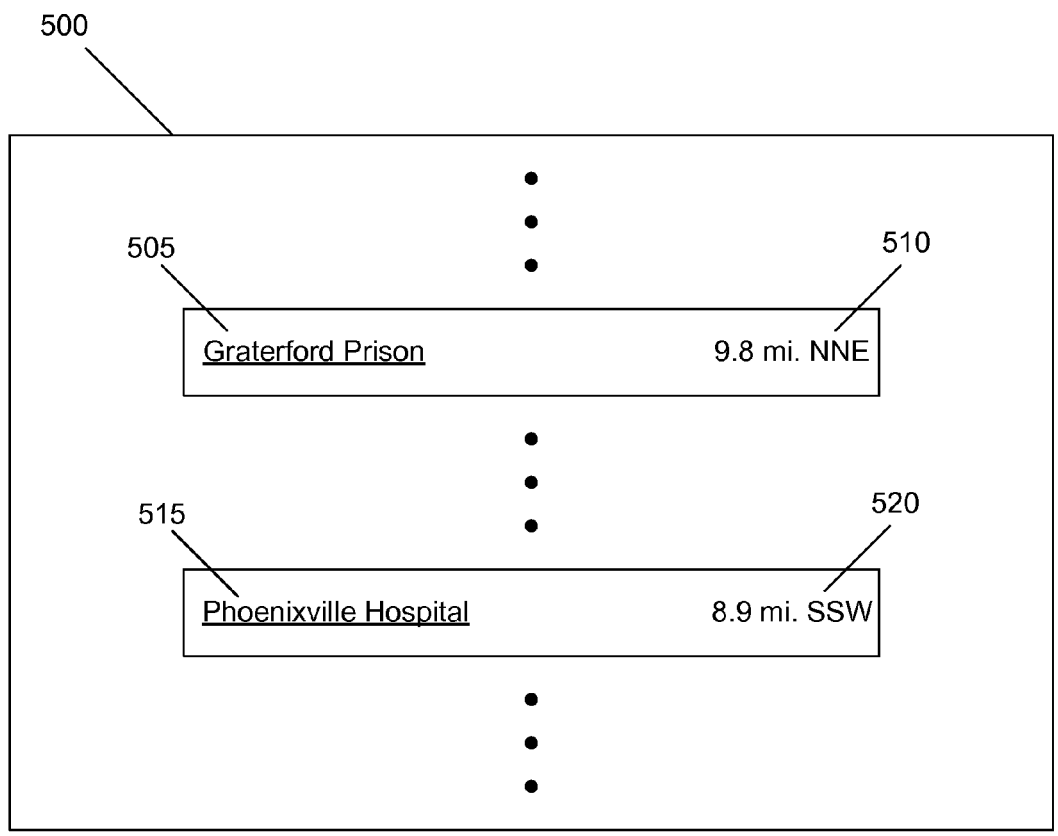
FIG. 5 illustrates an exemplary way to render information relating to real property.

FIG. 5 shows one example of how real property information may be provided to the end-user. FIG. 5 shows spreadsheet excerpts 500 containing real property information. FIG. 5 illustrates results from a search of the prisons 341 and hospitals 348 categories 305. The results from the prisons 341 search are displayed as Graterford Prison 505 and an associated distance of 9.8 ml. NNE 510. The results from the hospitals 348 search are displayed as Phoenixville Hospital 515 and an associated distance of 9.9 ml. SSW 520.

The real property information in the spreadsheet excerpts 500 may be conveyed to the end-user by any means, at any time, at any location. As a non-limiting example, the information may be sent to the device 120 as discussed in FIG. 1A. The device 120 may render the real property information in a spreadsheet format to the end-user. In another non-limiting example, the provider may email the information to the end-user. In another non-limiting example, the provider may fax the real property information to the end-user. Not all of the real property information may be displayed to the end-user at one time. For example, the real property information may be displayed to the user one row at a time.

As another way to keep the display concise, some information from the search may be available on separate pages. For example, the results may be listed as hyperlinks which take the end-user to another page to get details on the results. For example, FIG. 5 illustrates the result "Graterford Prison." "Graterford Prison" is underlined indicating that it is a hyperlink. An end-user may simply click on the hyperlink to get additional details. For example, by clicking the hyperlink "Graterford Prison," an end-user is taken to another page with detailed information on Graterford Prison as illustrated in FIG. 6.

FIG. 6 illustrates exemplary detailed information that may be available after activating the "Graterford Prison" hyperlink in FIG. 5. As shown in FIG. 6, a hyperlink page 600 may show more detailed information than the spreadsheet excerpts 500. For example, the hyperlink page 600 may have detailed categories 610 with data items 620. There categories 610 are Prison Name 611, Prison Type 612, Prison Address 613, Prison Map Location 614, and Number of Cells 615. The individual data items 620 that correspond to categories 610 are Graterford Prison 621, Maximum Security 622, Skippack Pike and Cross Rd., Graterford, Pa. 19426 623, Graterford Prison 624, and 2000 625. The Graterford Prison 624 data item 620 is itself a hyperlink that may be activated to get a map view of Graterford Prison.

As is apparent from the above, all or portions of the various systems, methods, and aspects of the present embodiments may be embodied in hardware, software, or a combination of both. It is noted that the foregoing examples have been provided merely for the purpose of explanation and are in no way to be construed as limiting of the present embodiments. While the embodiments have been described with reference to various examples, it is understood that the words which have been used herein are words of description and illustration, rather than words of limitation. Further, although the embodiments have been described herein with reference to particular methods and systems, the embodiments are not intended to be limited to the particulars disclosed herein; rather, the embodiments extend to all functionally equivalent structures, methods, systems and uses, such as are within the scope of the appended claims.

What is claimed is:

1. A method for requesting information relating to real property, the method comprising:
    initiating a real property query with a mobile device;
    determining a location where the real property query is made by detecting a location of the mobile device;
    associating a real property for sale with the location of the real property query;
    displaying a prompt to choose between a default search and a customized search; and
    receiving a selection to use the default search or the customized search, wherein the default search and the customized search include categories, wherein the categories include a number of sex offenders, a location, name, and type of each of a number of operating prisons within a defined distance from the real property query, and a list of a number and timing of home sale cancellations within a defined distance from the real property query.

2. The method of claim 1, wherein the categories include a list of a number and timing of home foreclosures within a defined distance from the real property query.

3. The method of claim 1, wherein at least one of the customized search and the default search include a limitation that narrows a scope of the categories.

4. The method of claim 1, further comprising accepting information relating to real property at a device used to initiate the real property query.

5. The method of claim 1, wherein choosing the customized search includes choosing at least one of: a category or a limiting parameter.

6. The method of claim 1, wherein choosing the customized search includes at least one of: creating a limiting parameter or customizing a limiting parameter.

7. The method of claim 1, wherein the categories include a location of power lines within a defined distance from the real property query.

8. A non-transitory computer-readable storage medium comprising computer-readable instructions, the computer-readable instructions comprising instructions that:
    initiate a real property query with a mobile device;
    determine a location where the real property query is made by detecting a location of the mobile device;
    associate a real property for sale with the location of the real property query;
    display a prompt to choose between a default search and a customized search; and
    receive a selection to use the default search or the customized search, wherein the default search and the customized search include categories, wherein the categories include a number of sex offenders, a location, name, and type of each of a number of operating prisons within a defined distance from the real property query, and a list of a number and timing of home sale cancellations within a defined distance from the real property query.

9. The non-transitory computer-readable storage medium of claim 8, wherein the categories include a list of a number and timing of home foreclosures within a defined distance from the real property query.

10. The non-transitory computer-readable storage medium of claim 8, wherein at least one of the customized search and the default search include a limitation that narrows a scope of the categories.

11. The non-transitory computer-readable storage medium of claim 8, further comprising computer-readable instructions, the computer-readable instructions comprising instructions that accept information relating to real property at a device used to initiate the real property query.

12. The non-transitory computer-readable storage medium of claim 8, wherein choosing the customized search includes choosing at least one of: a category or a limiting parameter.

13. The non-transitory computer-readable storage medium of claim 8, wherein choosing the customized search includes at least one of: creating a limiting parameter or customizing a limiting parameter.

14. The non-transitory computer-readable storage medium of claim 8, wherein the categories include a location of power lines within a defined distance from the real property query.

15. A system for requesting information relating to real property, wherein the system includes at least one computer having a computer processor and computer-readable instructions stored on a computer-readable medium and executable by the computer processor to request information relating to real property, the system comprising at least one subsystem that:
    initiates a real property query with a mobile device;
    determines a location where the real property query is made by detecting a location of the mobile device;
    associates a real property for sale with the location of the real property query;
    displays a prompt to choose between a default search and a customized search; and
    receives a selection to use the default search or the customized search, wherein the default search and the customized search include categories, wherein the categories include a number of sex offenders, a location, name, and type of each of a number of operating prisons within a defined distance from the real property query, and a list of a number and timing of home sale cancellations within a defined distance from the real property query.

16. The system of claim 15, wherein the categories include a list of a number and timing of home foreclosures within a defined distance from the real property query.

17. The system of claim 15, wherein at least one of the customized search and the default search include a limitation that narrows a scope of the categories.

18. The system of claim 15, further comprising at least one subsystem that accepts information relating to real property at a device used to initiate the real property query.

19. The system of claim 15, wherein choosing the customized search includes choosing at least one of: a category or a limiting parameter.

20. The system of claim 15, wherein choosing the customized search includes at least one of: creating a limiting parameter or customizing a limiting parameter.

21. The system of claim 15, wherein the categories include a location of power lines within a defined distance from the real property query.

\* \* \* \* \*